March 20, 1951 M. KOSIK 2,546,073
CUTTING TOOL HANDLE AND BLADE LINKAGE
Filed March 11, 1948 2 Sheets-Sheet 1

INVENTOR.
Martin Kosik
BY John Mahoney
attorney

March 20, 1951  M. KOSIK  2,546,073
CUTTING TOOL HANDLE AND BLADE LINKAGE
Filed March 11, 1948  2 Sheets-Sheet 2

INVENTOR
Martin Kosik
BY John Mahoney
Attorney

Patented Mar. 20, 1951

2,546,073

UNITED STATES PATENT OFFICE 2,546,073

CUTTING TOOL HANDLE AND BLADE LINKAGE

Martin Kosik, Cleveland, Ohio, assignor of fifty per cent to Adam Meredyk

Application March 11, 1948, Serial No. 14,169

10 Claims. (Cl. 30—252)

My invention relates to an improved cutting tool handle and blade linkage which may be utilized for a great variety of purposes, such as for cutting wire, trimming the hoofs of horses, as a shears for cutting cloth, or as clippers for pruning trees, shrubs, or the like.

The object of my invention is to provide a tool having improved means for producing leverage during the rotation of a pair of handles to close or open a pair of shears or jaws for any desired purpose.

My invention will be better understood by reference to the accompanying drawings in which.

Figure 1:
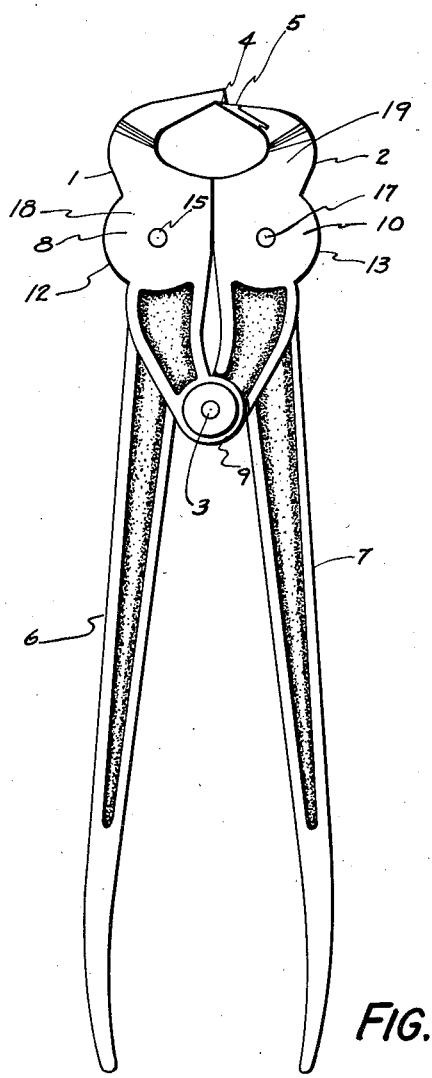
Fig. 1 is a side elevational view of my improved tool.

While my improved tool is adapted for various uses and may be formed in various ways, as illustrated in the drawings, it comprises a pair of jaws 1 and 2 which are pivotally connected together at adjacent ends on a pivot pin 3 and which terminate at their outer free ends in cutting or shearing portions 4 and 5 and which engage each other to effect a nipping or shearing action and which are opened and closed by the cooperative action of a pair of handles 6 and 7 and a plurality of links arranged between the handles.

Figure 3:
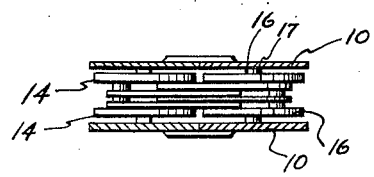
Fig. 3 is a cross sectional view on the line 3—3 of Fig. 2.

My improved tool may be constructed of any desired material, such as cast iron, steel, or the like. The cutting portion 5, however, is preferably formed of a hard cutting material, such as a ferrous base alloy containing nickel or chromium, or both, or it may be formed of tungsten carbide and may be secured to the adjacent portion of jaw 2 by any suitable means, such as rivets 5a, only one of which is shown. The jaws 1 and 2 are pivoted together at their inner ends in any desired manner and their free ends are movable toward and away from each other. As illustrated, jaw 1 is bifurcated as it extends away from its cutting portion 4 to provide oppositely disposed plates 8, each of which terminates in an apertured disc 9 which discs are spaced from each other. In a like manner, jaw 2 is bifurcated as it extends inwardly from its cutting portion 5 to provide spaced plates 10 as illustrated more particularly in Fig. 3 which terminate in an apertured cylindrical member 11 which is arranged between discs 9; and the discs 9 and cylindrical portion 11 are pivotally mounted on pin 3 which extends through the apertures in the discs 9 and cylindrical member 11.

Figure 2:
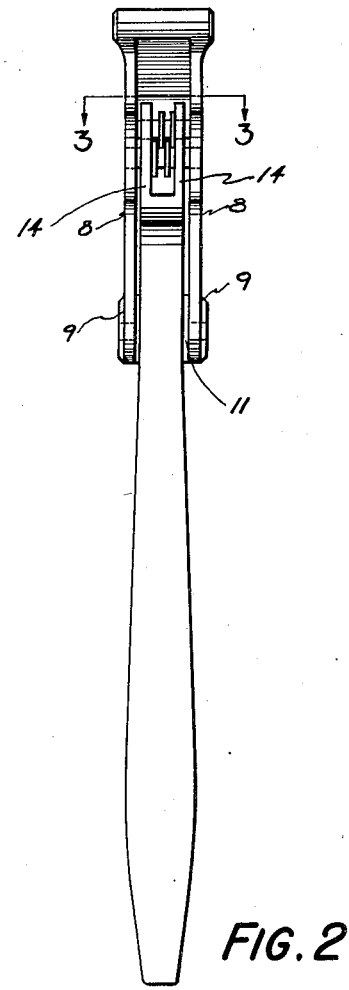
Fig. 2 is an end elevational view of the tool shown in Fig. 1.
Figure 5:
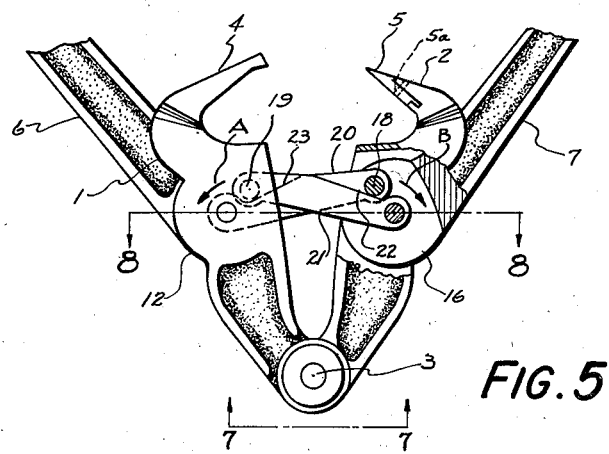
Fig. 5 is an elevational view of the tool shown in Figs. 1 and 3 with the shearing or cutting jaws in open position and showing the handles partly broken away.

As illusrated more particularly in Figs. 1, 2 and 5, plates 8 of jaw 1 are provided with a pair of spaced arcuate-shaped portions 12 to receive one end of handle 6 and in a like manner plates 10 of jaw 2 are provided with a pair of spaced arcuate-shaped portions 13 to receive one end of handle 7. The inner portion of handle 6 which extends between plate 8 is also bifurcated to provide a pair of substantially disc-shaped members 14 having arcuate-shaped outer surfaces which preferably have the same or substantially the same degree of curvature as the arcuate-shaped portions 12 of plates 8 and a pin 15 extends through plates 8 and the disc-shaped members 14 which is concentric to the arcuate-shaped surfaces of the discs 14 and serves as a pivot for handle 6. In a like manner, handle 7 is bifurcated to provide spaced substantially disc-shaped members 16 which preferably have the same degree of curvature as the arcuate-shaped portions 13 of jaw 2 and extending through plates 10 and the discs 16 and arranged concentric to the arcuate-shaped portions of discs 16 is a pin 17 which forms a pivot for handle 7.

As illustrated in Fig. 1 of the drawings, the jaws are in closed position with the hard cutting portion on jaw 2 engaging jaw 1 and with handles 6 and 7 engaging the cylindrical portion 11 on the inner portion of jaw 2 and means are provided for producing a leverage action to move the jaws toward and away from each other as the handles are rotated on their respective pivots. For this purpose, one or more links 20 are provided, one end of each of which is pivotally mounted on pin 15 and the other end of each of which links is mounted on a pin 18 arranged eccentrically to discs 16 and which pin extends through apertures in the bifurcated disc-shaped members on handle 7 and one or more links 21 are provided, one end of each of which is pivotally mounted on pin 17 and the other end of each of which is mounted on a pin 19 arranged eccentrically to discs 14.

Figure 4:
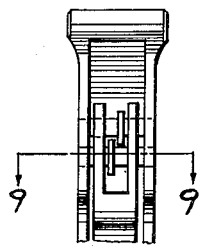
Fig. 4 is a fragmentary end elevational view of a modification of the tool shown in Fig. 2.
Figure 9:
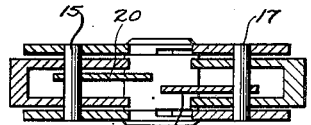
Fig. 9 is a cross sectional view on a plane passing through line 9—9 of Fig. 4, looking in the direction of the arrows when the jaws are in open position.

The number of links which are utilized will of course depend upon their size and upon the size of the tool. For small tools, two links as shown in Figs. 4 and 9 are sufficient while in larger tools four or more links may be utilized. When four or more links are utilized, they are preferably arranged in pairs with links 20 being alternately arranged with respect to links 2

As illustrated in Figs. 1 to 3 and 8 of the drawings, four links are provided including a pair of links provided with apertures in one end which are pivotally mounted on concentric pin 15 which extends through plates 8 of jaw 1 and discs 14 of handle 6 and which are provided with aligned apertures at their opposite ends which receive pin 18 which extends through the spaced discs 16 of handle 7.

The other pair of links 21 are provided with apertures at one end to receive pin 17 which extends through plates 10 and spaced discs 16. The opposite ends of links 21 are also provided with aligned apertures to receive a pin 19 which extends through apertures in discs 14.

Figure 6:
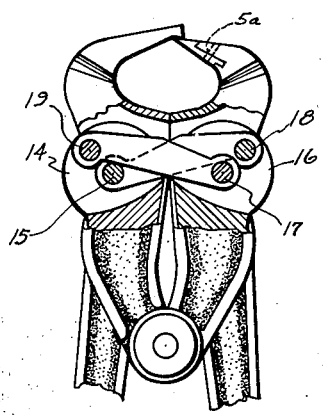
Fig. 6 is a view similar to that shown in Fig. 1 with a portion of the front plate of each jaw being broken away to show adjacent structure.
Figure 7:
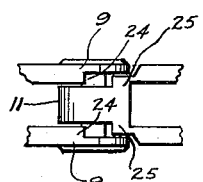
Fig. 7 is a view of the pivoted portion of the tool on a plane passing through the line 7—7 of Fig. 5, looking in the direction of the arrows.
Figure 8:
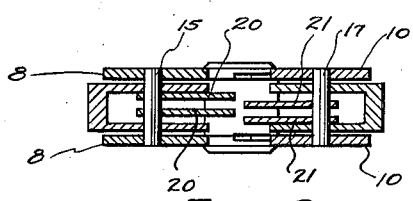
Fig. 8 is a cross sectional view taken on a plane passing through the line 8—8 of Fig. 5, looking in the direction of the arrows.

In moving handles 6 and 7 to actuate jaws 1 and 2 from their open position shown in Fig. 5 to their closed position shown in Figs. 1 and 6, pin 19 is moved in the direction of arrow A and pin 18 is moved in the direction of arrow B as shown in Fig. 5 of the drawings. It will thus be seen that as handles 6 and 7 are rotated on pivot pins 15 and 17 in a direction to move the handles toward each other, handle 6 exerts a leverage action through each link 20 to move handle 7, and handle 7 exerts a leverage action through each link 21 to move handle 6 and that pivot pins 15 and 17 are moved toward each other to move the free ends of the jaws together. It is therefore apparent that during the rotation of handles 6 and 7, a leverage action is provided which forces the cutting or shearing portion of jaw 2 into engagement with the bevelled portion of jaw 1.

As illustrated in Figs. 1 and 5, links 20 and 21 are formed in such a manner that they may be rotated the required distance to effect opening and closing movement of handles 6 and 7 and jaws 1 and 2. For this purpose, each of the links 21 is provided with a bevelled portion 22 and each of the links 20 is provided with a bevelled portion 23 and when the parts are in the fully open position as shown in Fig. 5, pin 18 will rest against the lower bevelled portion of each of the links 20 and pin 19 will bear against the lower bevelled portion of each of the links 21 in which position they prevent further opening movement of the handles. If desired, however, means may be provided for preventing extreme opening movement of the handles before pins 18 and 19 engage links 20 and 21. For this purpose, discs 9 may be provided with oppositely disposed shoulders 24 which are engaged by outwardly extending portions 25 on the cylindrical portion 11 of handle 7.

What I claim is:

1. A tool comprising first and second jaws, means for pivotally connecting adjacent ends of said jaws together and said jaws terminating at their opposite ends in portions movable into and from engagement with each other, and each of said jaws being provided with a pair of spaced plates arranged between the pivot point of said jaws and its free end, a first handle having at one end a pair of spaced substantially disc-shaped members arranged between the plates of the first jaw, means for pivotally mounting the first handle to the first jaw substantially centrally of said discs, connecting means arranged between the discs of the first handle eccentrically of the first handle pivoting means, a second handle having at one end a pair of substantially disc-shaped members extending between the plates of the second jaw, means for pivotally mounting the second handle to the second jaw substantially through the central portion of its discs, connecting means arranged between the discs of the second handle eccentrically of the second handle pivoting means, and means for moving the portions at the free ends of said jaws away from and toward each other when said handles are rotated on their pivots including a link having one end mounted on the first handle pivoting means and its opposite end secured to the means connecting the discs of the second handle and a second link having one end mounted on the second handle pivoting means and its opposite end secured to the means connecting the discs of the first handle.

2. A tool comprising first and second jaws pivotally connected together at adjacent ends, each of said jaws being provided at its free end with a portion movable into and from engagement with a portion on the other jaw, a first handle pivotally mounted adjacent one of its ends on the first jaw between the pivot point and the free end portion of the first jaw and having link mounting means arranged eccentrically to its pivot, a second handle pivotally mounted on the second jaw between the pivot point and the free end portion of the second jaw and having a link mounting means arranged eccentrically to its pivot, a first link having one end mounted on the pivoting means for the first handle and its opposite end connected to the link mounting means on the second handle, a second link having one end mounted on the pivoting means for the second handle and its opposite end connected to the link mounting means on the first handle, said eccentrically arranged link mounting means on the first handle being movable in a counterclockwise direction to thereby exert a pulling action on the pivoting means for the second handle and a pushing action on the first handle and said eccentrically arranged link mounting means on the second handle being movable in a clockwise direction to exert a pulling action on the pivoting means for the first handle and a pushing action on the second handle to thereby move the two handle pivoting means toward each other during rotation of said handles on their pivots in a direction to move their free ends toward each other, and the movement of the two pivoting means toward each other being effective in moving the free end portions of said jaws into engagement with each other.

3. A tool comprising first and second jaws pivotally connected together at adjacent ends, each of said jaws being provided at its free end with a portion movable into and from engagement with a portion on the other jaw, a first handle pivotally mounted adjacent one of its ends on the first jaw between the pivot point and the free end portion of the first jaw and having a link mounting means arranged eccentrically to its pivot at a distance more remote from the 2,546,073

5 pivot end of the first jaw than that of the first handle pivoting means, a second handle pivotally mounted on the second jaw between the pivot point and the free end portion of the second jaw and having a link mounting means arranged eccentrically to its pivoting means which is arranged at a distance more remote from the pivot point of the second jaw than that of the second handle pivoting means, a first link having one end mounted on the pivoting means for the first handle and its opposite end connected to the link mounting means on the second handle, a second link having one end mounted on the pivoting means for the second handle and its opposite end connected to the link mounting means on the first handle, said two eccentrically arranged link mounting means being arranged closer to each other than the two handle pivoting means when said jaws and handles are in open position and said eccentrically arranged link mounting means being movable in opposite direction from each other during rotation of said handles on their pivots in a direction to move said jaws into engagement with each other and to exert a pulling action on the two handle pivoting means to draw them closer together than said eccentrically arranged link mounting means and to exert a pushing action on said handles as they are rotated on their pivoting means to thereby facilitate rotation of said handles on their pivots to move their free ends toward each other, and said links being also effective during the rotation of said handles on their pivots in the opposite direction to exert a pulling action on said handles to move the link mounting means closer to each other and a pushing action on said pivoting means to move the handle pivoting means away from each other and to disengage the free end portions of said jaws from each other.

4. A tool comprising first and second jaws pivotally connected together at adjacent ends, each of said jaws being provided at its free end with a portion movable into and from engagement with a portion of the other jaw, a first handle terminating in a disc-shaped portion which is pivoted centrally thereof to the first jaw between the pivot point and the free end portion of the first jaw and which is provided eccentrically of its pivot with a link mounting means, a second handle terminating in a disc-shaped portion which is pivoted centrally thereof to the second jaw between the pivot point and the free end portion of the second jaw and is provided eccentrically of its pivot with a link mounting means, a first link having one end mounted on the pivoting means for the first handle and having its opposite end connected to the eccentrically arranged link mounting means on the second handle, a second link having one end mounted on the pivoting means for the second handle and having its opposite end connected to the eccentrically arranged link mounting means on the first handle, said eccentrically arranged mounting means for the first link on the second handle being movable in a clockwise direction and said eccentrically arranged mounting for the second link on the disc portion of the first handle being movable in a counterclockwise direction during rotation of said handles on their pivots in a direction to move their free ends toward each other to provide a pulling action on the handle pivoting means to move them toward each other to close the end portions of said jaws and to provide a pushing action to move the eccentric-

6 ally arranged link mounting means away from each other and to facilitate rotation of said handles during movement of the free ends of said handles toward each other.

5. A tool comprising first and second jaws connected together at adjacent ends, each of said jaws being provided at its free end with a portion movable into and from engagement with a portion of the other jaw, a first handle terminating in a disc-shaped portion which is pivoted centrally thereof to the first jaw between the pivot point and the free end portion of the first jaw and which is provided with a link mounting means arranged eccentrically of its pivot at a distance more remote from the pivot point of said jaw than that of the first handle pivoting means, a second handle having a disc-shaped portion which is pivoted centrally thereof to the second jaw between the pivot point and the free end portion of the second jaw and which is provided eccentrically of its pivot with a link mounting means which link mounting means is arranged at a distance more remote from the pivot of said jaw than that of the second handle pivoting means, a first link having one end mounted on the pivoting means for the first handle and its opposite end connected to the link mounting means on the disc portion of the second handle, and a second link having one end mounted on the pivoting means for the second handle and its opposite end connected to the link mounting means on the first handle, said eccentric mounting for the first link on the disc portion of the second handle being movable in a clockwise direction and the eccentrically arranged mounting means for the second link on the disc portion of the first handle being movable in a counterclockwise direction during rotation of said handles on their pivots in a direction to move their free ends toward each other to thereby provide a pulling effect on the two handle pivoting means to move them toward each other and to move the free end portions of said jaws into engagement with each other and to provide a pushing action to move the eccentrically arranged mounting means away from each other to thereby facilitate rotation of said handles in a direction to move their free ends toward each other.

6. A tool comprising first and second jaws pivotally connected together at adjacent ends and each of said jaws being provided with a portion at its free end which is movable into and from engagement with a portion on the other jaw, each of said jaws having spaced plates arranged intermediate its pivot point and its free end portion, a first handle terminating in a disc-shaped portion which is arranged between the plates of the first jaw and which is provided with a central opening and a link mounting means arranged eccentrically to its central opening, a pivot pin extending through the plates of the first jaw and the opening in the disc portion of the first handle, a second handle terminating in a disc-shaped portion arranged between the plates of the second jaw and having a central opening and a link mounting means arranged eccentrically to the central opening, a pivot pin extending through the plates of the second jaw and the central opening in the disc portion of the second handle, a link having one end mounted on the pivot pin of the first handle and its opposite end connected to the link mounting means on the second handle and a second link having one end mounted on the pivot pin of the second handle and its opposite end connected to the link mounting means of the first handle, said eccentrically arranged mountings for the links being arranged closer to each other than said pivot pins when the free ends of said jaws are fully spaced from each other, and the rotation of said handles on said pivot pins in a direction to move their free ends toward each other being effective in rotating the disc portion of the first handle in a counterclockwise direction and the disc portion of the second handle in a clockwise direction to pull said pivot pins toward each other and to move the free end portions of said jaws into engagement with each other and to provide a pushing action of said links on said handles to facilitate the movement of their free ends toward each other as the eccentrically arranged mounting means on said handles are moved away from each other.

7. A tool comprising first and second jaws pivotally connected together at adjacent ends, each of said jaws being provided at its free end with a portion movable into and from engagement with the free end portion of the other jaw, a first handle having one end pivoted to the first jaw intermediate its pivot point and its free end portion, a second handle having one end pivoted to the second jaw intermediate its pivot point and its free end portion, and means for moving the free end portions of said jaws into and from engagement with each other upon rotation of their handles upon their pivots including a pair of first links having adjacent ends connected to the first handle pivoting means and their opposite ends connected to the fixed end of the second handle eccentrically of the second handle pivoting means, and a pair of second links having adjacent ends connected to the second handle pivoting means and their opposite ends connected to the fixed end of the first handle eccentrically to the first handle pivoting means and each of the first pair of links being alternately arranged relative to the second handle pivoting means, and the rotation of said handles on their pivots in a direction to move their free ends toward each other being effective in causing the eccentrically connected end of each pair of links to move in arcuate directions opposite to each other around the respective pivoting means of the handle to which it is connected and to move the first and second handle pivoting means toward each other and to exert a pushing act on said handles to facilitate their rotation, and said links being effective in exerting a pulling effect on said handles and a pushing effect on said handle pivoting means to move the two handle pivoting means away from each other when said handles are rotated on said pivots to move their free ends away from each other.

8. A tool comprising first and second jaws pivotally connected together at adjacent ends, each of said jaws being provided at its free end with a portion movable into and from engagement with the portion at the free end of the other jaw, a first handle having one end pivoted to the first jaw intermediate its pivot point and its free end portion, a second handle having one end pivoted to the second jaw intermediate its pivot point and its free end portion and means for moving the free end portions of said jaws away from and toward each other upon rotation of said handles upon their pivots including a first link having one end connected to the first handle pivoting means and its opposite end connected to the fixed end of the second handle eccentrically of the second handle pivoting means, and a second link having one end connected to the second handle pivoting means and its opposite end connected to the fixed end of the first handle eccentrically to the first handle pivoting means, the rotation of said handles being effective in causing the eccentrically connected end of each of said links to move in arcuate directions opposite to each other around the respective pivoting means of the handle to which it is connected to move the first and second handle pivoting means away from and toward each other and to exert a pushing effect on each handle during the movement of the free end portions of said handle toward each other and a pulling effect on said handles as their free ends are moved away from each other, and that portion of the first link that is adjacent the first pivoting means and that portion of the second link that is adjacent the second pivoting means being each bevelled on one side to permit said handles to be moved to a fully open position.

9. A tool comprising first and second jaws, means for pivotally connecting adjacent ends of said jaws together and said jaws terminating at their opposite ends in cooperative portions which are movable away from and toward each other, and each of said jaws being provided with a pair of spaced plates arranged between the pivotal point of said jaw and its free end portion, a first handle having at one end a pair of spaced substantially disc-shaped members arranged between the plates of the first jaw, means for pivotally mounting the first handle to the first jaw substantially centrally of said discs, a pin arranged between the discs of the first handle eccentrically of the pivoting means for the first handle, a second handle having at one end a pair of substantially disc-shaped members extending between the plates of the second jaw, means for pivotally mounting the second handle on the second jaw substantially centrally of the discs of the second handle, a pin arranged eccentrically of the second handle pivoting means, and means for moving the free end portions of said cutting or shearing members away from and toward each other when said handles are rotated on their pivots including a pair of links having adjacent ends mounted on the pivoting means for the first handle and their opposite ends mounted on the pin extending eccentrically to the second handle pivoting means, and a second pair of links arranged in alternate relation to the first pair of links and having adjacent ends mounted on the pivoting means for the second handle and their opposite ends mounted on the pin which is eccentric to the first handle pivoting means.

10. A tool comprising first and second jaws, means for pivotally connecting adjacent ends of said jaws together and said jaws terminating at their opposite ends in portions movable away from and toward each other, and each of said jaws being provided with a pair of spaced plates arranged between the pivotal point of said jaw and its free end portion, a first handle having a pair of spaced substantially disc-shaped members arranged between the plates of the first jaw, means for pivotally mounting the first handle on the first jaw substantially centrally of said discs, a pin arranged between the discs of the first handle eccentrically of the pivoting means for the first handle, a second handle having at one end a pair of substantially disc-shaped members extending between plates of the second jaw, means for pivotally mounting the second handle to the second jaw substantially centrally of the discs of the second handle, a pin arranged eccentrically of the second handle pivoting means, and means for moving the free end portions away from and toward each other when said handles are rotated on their pivots, including a plurality of links having adjacent ends mounted on the first handle pivoting means and their opposite ends mounted on the pin extending eccentrically to the second handle pivoting means, a plurality of second links having adjacent ends mounted on the pivoting means for the second handle and their opposite ends mounted on the pin which is eccentric to the first handle pivoting means, and the portions of the first links adjacent the first pivoting means and the portions of the second links adjacent to the second pivoting means being bevelled on one side to permit the pins connecting each pair of discs to be moved through an extended arc when the handles are moved from their closed to a fully open position.

MARTIN KOSIK.

REFERENCES CITED

The following references are of record in the file of this patent:

UNITED STATES PATENTS

| Number | Name | Date |
| --- | --- | --- |
| 509,125 | Hamann | Nov. 21, 1893 |
| 1,801,460 | Smith | Apr. 21, 1931 |
| 1,818,237 | Medean | Aug. 11, 1931 |

FOREIGN PATENTS

| Number | Country | Date |
| --- | --- | --- |
| 7,659 | Switzerland | Mar. 14, 1894 |
| 416,099 | Great Britain | Sept. 13, 1934 |